United States Patent
Driscoll

(10) Patent No.: US 9,418,373 B2
(45) Date of Patent: Aug. 16, 2016

(54) INTERACTIVE ADVERTISING USING DIGITAL WATERMARKS

(71) Applicant: Fujitsu Limited, Kanagawa (JP)

(72) Inventor: Kevin Patrick Driscoll, Frisco, TX (US)

(73) Assignee: Fujitsu Limited, Kawasaki-shi (JP)

( * ) Notice: Subject to any disclaimer, the term of this patent is extended or adjusted under 35 U.S.C. 154(b) by 158 days.

(21) Appl. No.: 13/855,577

(22) Filed: May 17, 2013

(65) Prior Publication Data

US 2014/0344033 A1 Nov. 20, 2014

(51) Int. Cl.
*G06K 9/00* (2006.01)
*G06Q 30/02* (2012.01)
*G06T 1/00* (2006.01)

(52) U.S. Cl.
CPC ........ *G06Q 30/0273* (2013.01); *G06K 9/00744* (2013.01); *G06Q 30/0211* (2013.01); *G06T 1/0021* (2013.01)

(58) Field of Classification Search
None
See application file for complete search history.

(56) References Cited

U.S. PATENT DOCUMENTS

| | | | |
|---|---|---|---|
| 2002/0004746 A1* | 1/2002 | Ferber et al. ................. | 705/14 |
| 2002/0013728 A1* | 1/2002 | Wilkman ..................... | 705/14 |
| 2007/0124789 A1* | 5/2007 | Sachson ............... | G06Q 30/00 725/117 |
| 2008/0091526 A1* | 4/2008 | Shoemaker ........... | G06Q 20/10 705/14.55 |
| 2008/0120186 A1* | 5/2008 | Jokinen et al. ............... | 705/14 |
| 2012/0163653 A1 | 6/2012 | Anan et al. | |
| 2013/0051772 A1* | 2/2013 | Ramaswamy et al. ........ | 386/291 |

* cited by examiner

*Primary Examiner* — Sumati Lefkowitz
*Assistant Examiner* — Ryan P Potts
(74) *Attorney, Agent, or Firm* — Baker Botts L.L.P.

(57) ABSTRACT

A method and system for interactive advertising may use digital watermarks embedded in multimedia content displayed to a user of a mobile device that includes a camera. The user may capture the digital watermark by simply recording the multimedia content using the camera on the mobile device. A digital watermark value obtained from the digital watermark may be sent to a watermark service provider who validates the digital watermark value and returns an advertising token to the mobile device. The advertising token may be usable by the user to receive promotions, offers, and other information associated with an advertiser.

20 Claims, 4 Drawing Sheets

INTERACTIVE ADVERTISING USING DIGITAL WATERMARKS

BACKGROUND

1. Field of the Disclosure

The present disclosure relates to interactive advertising and, specifically, to interactive advertising using digital watermarks.

2. Description of the Related Art

Recently, digital watermarks have been developed that enable transmission of information through video data. The digital watermark may be used to transmit information from a television display or a digital billboard to a smart phone equipped with a camera. A digital watermark that can be recognized using a smart phone camera, yet is imperceptible to the human eye, is described in U.S. Patent Publication No. 2012/0163653 A1.

Furthermore, advertisers often have little or no direct interaction with consumers viewing video advertisements, such as television commercials. The lack of interactivity with consumers may constrain the value provided by advertising to both the advertiser and the consumer.

SUMMARY

In one aspect, a disclosed method includes receiving, at a server, a digital watermark value from a mobile device, wherein the digital watermark value is associated with a digital watermark imperceptible to the human eye embedded in video content output to a video display, receiving demographic information from the mobile device, and validating the digital watermark value, including determining an advertiser associated with the video content. The demographic information may describe a user of the mobile device. Responsive to validating the digital watermark value, the method may include sending an advertising token to the mobile device, wherein the advertising token is usable by the user to interact with the advertiser.

In certain embodiments, when the user accesses the advertising token, the method may further include receiving an indication from the mobile device that the advertising token is being used, and associating the usage data for the advertising token with the demographic information. The usage data may include a date and time associated with usage of the advertising token, a type of usage of the advertising token, an amount of usage associated with the advertising token, a location associated with usage of the advertising token, a universal resource locator (URL) associated with usage of the advertising token, a purchase amount associated with usage of the advertising token, information provided by the user in response to the advertising token, or a combination thereof. Based on the demographic information and the usage data, the method includes determining a price for future advertisements that include a digital watermark. Based on the receiving the digital watermark value, the method may also include determining that the user has replayed the video content after the video content has been broadcast. The advertising token may include an electronic coupon for the user, the electronic coupon being usable for a transaction associated with the advertiser. The advertising token may include a link to a website associated with the advertiser.

In various embodiments, the method operation of validating the digital watermark value may include determining a date and time associated with the video content, determining a location of the mobile device, determining a media market associated with the video display, determining a television program during which the video content is broadcast, determining a television channel on which the video content is broadcast, determining at least one advertising token associated with the digital watermark value, validating that the advertiser ordered the digital watermark to be included in the video content, validating that a mobile app executing on the mobile device is registered to the user, or a combination thereof.

Additional disclosed aspects for performing interactive advertising using digital watermarks include a server and an article of manufacture comprising non-transitory computer readable memory media storing processor-executable instructions.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
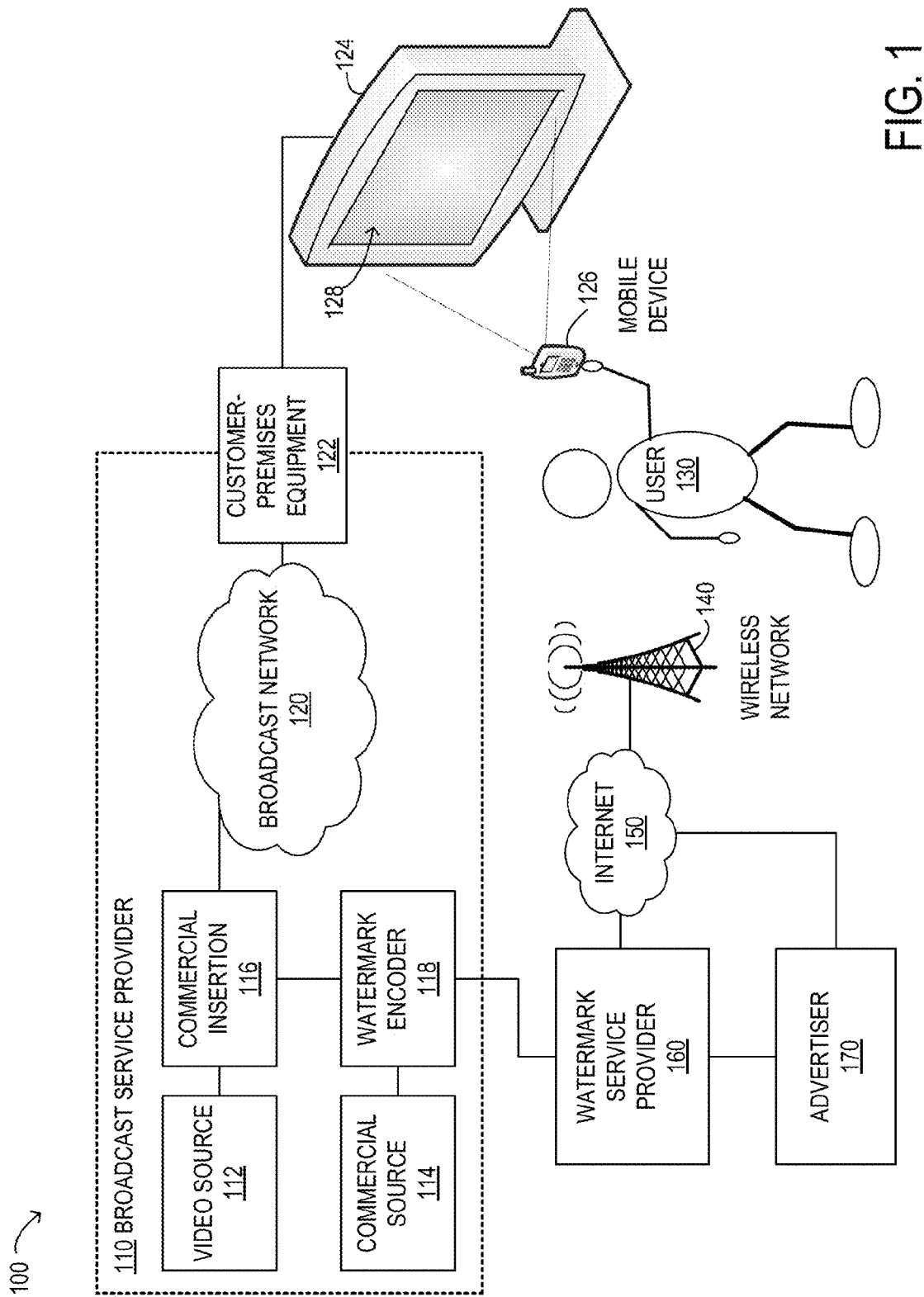
FIG. 1 is a block diagram of selected elements of an embodiment of a digital watermarking system.

Turning now to the drawings, FIG. 1 is a block diagram showing selected elements of an embodiment of watermark system 100. As will be described in further detail, watermark system 100 may enable interactive advertising using digital watermarks that are embedded into multimedia content and output to a display device.

As shown in FIG. 1, broadcast service provider 110 may represent functionality associated with a broadcasting entity that provides multimedia content to a plurality of end users (not shown). Examples of broadcast service provider 110 may include television broadcasters, cable service providers, digital subscriber line (DSL) service providers, and/or other network providers. Video source 112 may represent facilities to obtain and/or acquire multimedia content for broadcast. For example, when broadcast service provider 110 is a local television station, video source 112 may represent a head-end that receives national multimedia content along with locally generated content. In some embodiments, video source 112 may provide video-on-demand content available through broadcast service provider 110. Thus, video source 112 may be a source for live content as well as for other types of recorded content.

Also in FIG. 1, commercial source 114 may represent an originator of commercials that may be broadcast by broadcast service provider 110. It is noted that commercial source 114 may be a non-exclusive source of commercials broadcast by broadcast service provider 110. For example, video source 112 may provide content streams that already include certain commercials. Commercial source 114 may receive commercials from a production source (not shown) and may provide the commercials to broadcast service provider 110. Watermark encoder 118 may represent a device for encoding digital watermarks into video content, such as described in U.S.

Patent Publication No. 2012/0163653 A1. As shown in FIG. 1, watermark encoder 118 may encode a digital watermark into commercials provided by commercial source 114. The digital watermark encoded by watermark encoder 118 may be imperceptible to the human eye, but may be captured by a digital camera, as will be described in further detail. It is noted that watermark encoder 118 may communicate with watermark service provider 160 to coordinate and track digital watermarks. Watermark encoder 118 may provide commercials encoded with a digital watermark to commercial insertion 116. Commercial insertion 116 may represent operations of broadcast service provider 110 to insert commercials into multimedia content streams, such as television channels, that are provided by broadcast service provider 110 to a plurality of end users.

In FIG. 1, broadcast network 120 is shown as an aggregate element representing various networks and broadcast methods. In certain embodiments, broadcast network 120 includes an over-the-air broadcast medium to reach the end users. When broadcast service provider 110 provides cable television services, broadcast network 120 may include a cable television network. When broadcast service provider 110 provides broadband services, including digital television, such as Internet-protocol television (IPTV), broadcast network 120 may include a broadband network, such as a DSL network or a digital cable network. Furthermore, broadcast network 120 may represent a hierarchical network topology (not shown) that may include high-throughput backhaul network segments for regional or national communication, as well as access network segments for local distribution (i.e., including the so-called 'last mile' to end users). Broadcast network 120 is shown connected to customer-premises equipment 122, which may represent end-user equipment used by an end user. Although a single instance of customer premises equipment 122 is shown for descriptive clarity, it will be understood that broadcast service provider 110 and/or broadcast network 120 may be equipped to provide service to large numbers of end users in different regional and national markets.

As shown in FIG. 1, customer premises equipment 122 may represent an endpoint in the offerings provided by broadcast service provider 110. For example, customer premises equipment 122 may represent a terminal device on broadcast network 120. In certain embodiments, customer premises equipment 122 may remain property of broadcast service provider 110 and be provided to end users subscribing to the offerings of broadcast service provider 110. In various embodiments, customer premises equipment 122 may represent a set-top box or similar device for receiving multimedia content provided by broadcast service provider 110. In given embodiments, customer premises equipment 122, while equipped and configured to output multimedia content, may not itself include a display device, but rather, may interface with video display 124 at the premises of the end user. In particular embodiments, video display 124 is a television that outputs video and audio. Thus, video display 124 may output multimedia content 128 that includes programming provided by broadcast service provider 110. Multimedia content 128 may include an embedded digital watermark, which is also output on video display 124 in the manner described herein.

Although in the foregoing description of FIG. 1, broadcast service provider 110 and video display 124 are described as providing television services, the present disclosure is also applicable to other instances where multimedia content is output to a video display. For example, video display 124 may represent an electronic billboard that receives and outputs multimedia content including embedded digital watermarks. In another example, video display 124 may be a large public display, such as a video screen at a sporting event that may output embedded digital watermarks to attendees of the sporting event.

As depicted in FIG. 1, user 130 may view video display 124 in any of a variety of situations and locations. When a digital watermark appears on video display 124, user 130 may receive a notification that the digital watermark is available for capture. In one embodiment, the notification may be a symbol displayed concurrently with the digital watermark on video display 124. In some embodiments, the notification may be a message and/or an indication sent to mobile device 126 (see also FIG. 2), which may represent a smart phone or other personal mobile device associated with user 130. The digital watermark may be ordered to be placed in a commercial advertisement by advertiser 170 for the purposes of interacting with viewers of the commercial advertisement, as will be described in further detail. Accordingly, user 130 may be incentivized to capture multimedia content 128 output by video display 128 using a camera (not shown in FIG. 1, see FIG. 2, item 212) included with mobile device 126, which may also be configured with a mobile application (referred to herein as an 'app') for detecting and registering embedded digital watermarks using the camera. The mobile app may be offered by watermark service provider 160 to user 130 for the purposes of capturing digital watermarks and participating in interactive advertising.

As shown in FIG. 1, mobile device 126 may be in communication with wireless network 140, which may represent a wireless communication service provided to user 130. For example, when mobile device 126 is a smart phone, wireless network 140 may represent a so-called 3G or 4G cellular wireless network that provides integrated telephony, messaging, multimedia services, and digital network access, including wireless access to the Internet 150. In this manner, mobile device 126 may include web-enabled functionality, among other types of connectivity. Via a connection to Internet 150, mobile device 126 may be able to communicate with watermark service provider 160 and/or advertiser 170. It is noted that, in certain embodiments, watermark service provider 160 and/or advertiser 170 may represent the same business entity as broadcast service provider 110.

In operation of watermark system 100, advertiser 170 may desire to place an interactive advertisement including a digital watermark as a television commercial, for example. Advertiser 170 may purchase advertising for its own use, or as an agent on behalf of a client of advertiser 170. Advertiser 170 may arrange for the television commercial to be provided to commercial source 114 and may engage watermark service provider 160 to place a digital watermark in the television commercial, including specifying what types of interaction are to be enabled using the digital watermark. Watermark service provider 160 may generate a digital watermark value and may instruct watermark encoder 118 to embed this value as a digital watermark into the television commercial. When the television commercial is broadcast by broadcast service provider 110 and output to video display 124, user 130 may be notified in advance of the digital watermark and may capture multimedia content 128 using mobile device 126. For example, user 130 may activate a digital watermark capture app (see also FIG. 2) installed on mobile device 126 that detects the digital watermark from image data provided by a camera included with mobile device 126. The digital watermark capture app may communicate a digital watermark value obtained from the digital watermark to a watermark server (not shown in FIG. 1, see FIG. 4) operated by watermark service provider 160, along with other information, such as demographic information describing user 130. Then, in response, mobile device 126 may receive an advertising token (not shown) intended for use by user 130. It is noted that, in certain instances, user 130 may capture the digital watermark at a later time than initially broadcast, for example, when user 130 has recorded the television commercial, including the digital watermark, for replay. Accordingly, watermark service provider 160 may be enabled to discern both a first time of capture of the digital watermark, as well as a second time of access to the advertising token. Based on the first time and the second time, watermark service provider 160 may determine that the user has replayed the multimedia content after the multimedia content has been broadcast.

The advertising token may be a message and/or other communication that enables any of a variety of responses by user 130 to further interact with advertiser 170 based on the content of the television commercial. For example, the advertising token may include an electronic coupon for a discount on a product or service that user 130 may purchase by accessing the advertising token. Other types of transactions associated with advertiser 170 may also be enabled by the electronic coupon, such as redemptions for products or services. The advertising token may include a link to a website associated with advertiser 170. The advertising token may enable special promotions, such as access and/or participation in on-line social media. The advertising token may enable user 130 to gift an item to another party. The advertising token may include functionality associated with broadcast service provider 110, such as selection and/or recording of a program, for example, using customer-premises equipment 122. The advertising token may enable user 130 to participate in a sweepstakes or other type of prize-drawing contest. When user 130 accesses the advertising token from mobile device 126, for example, the digital watermark capture app may also capture such activity as usage data for user 130.

Watermark service provider 160 may record the demographic information received from mobile device 126, as well as the subsequent interactions taken by user 130 in response to receiving the advertising token (i.e., usage data). In this manner, watermark service provider 160 may generate a knowledge base of both demography and actual usage data for previous interactive advertising, and may use this knowledge base to amplify the value offered with future interactive advertisements to advertiser 170. For example, based on demographic information and usage data associated with previous digital watermarks used in advertising, watermark service provider 160 may determine a price for future advertisements that include a digital watermark. User 130 may benefit from watermark system 100 from promotions offered using the advertising token. Advertiser 170 may benefit from watermark system 100 by the greatly enhanced and immediate feedback from potential customers, such as user 130, and may be able to better plan and execute advertising campaigns that specifically identify and reach a desired target audience.

Figure 2:
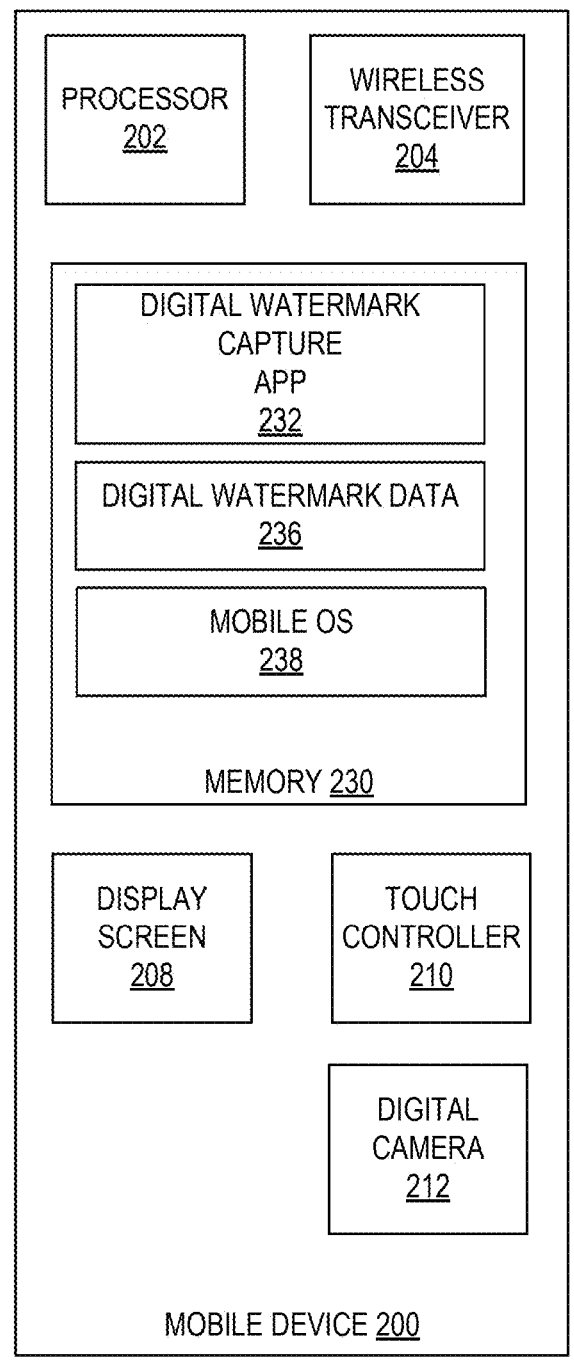
FIG. 2 is a block diagram of selected elements of an embodiment of a mobile device.

Referring now to FIG. 2, a block diagram of selected elements of an embodiment of mobile device 200 is depicted. Mobile device 200 may represent any of a variety of mobile devices with communication and data processing capability. In various embodiments, mobile device 200 is a smart phone that may includes various functionality selected from: cellular telephony, wireless networking, location sensing, motion sensing, digital imaging (i.e., a camera), touch screen operation, multimedia playback, data storage, among others. Accordingly, while certain aspects of mobile device 200 are shown in FIG. 2 for descriptive purposes, it will be understood that in different embodiments, mobile device 200 may include different types of functionality.

As shown in FIG. 2, mobile device 200 includes processor 202 and memory 230 that may store data and/or instructions executable by the processor. Memory 230 is shown including mobile OS 238, which may represent a mobile operating system being executed by processor 202. Examples of instances of mobile OS 238 include iOS (Apple Inc.) and Android™ (Google Inc.). Also, memory 230 may store digital watermark capture app 232 that is executable by processor 202 to acquire digital watermarks appearing on video display devices, as described herein. Memory 230 may also store digital watermark data 236, that may include demographic data for a user (not shown in FIG. 2, see FIG. 1) of mobile device 200, as well as usage data for actions taken by the user in response to capturing a digital watermark. It is noted that various apps executing on mobile device 200 may be configured to access diverse types of functionality included with mobile device 200, such as, but not limited to, imaging, communication, location-based services, gestures, touch input, motion of mobile device 200, Internet-connectivity, etc.

In FIG. 2, mobile device 200 may include at least one instance of wireless transceiver 204, which may provide wireless connectivity to various types of wireless networks, such as cellular telephony networks (e.g., 3G, 4G), wireless local area networks (e.g., IEEE 802.11), wireless personal area networks (e.g., Bluetooth®), among others. Display screen 208 and touch controller 210 may operate in combination to provide a touch-screen display for output to and control by the user. Mobile device 200 is also shown including at least one instance of digital camera 212, which may be used for interactive advertising using digital watermarks, as described herein.

In operation of digital watermark capture app 232 on mobile device 200, the user may first obtain and install digital watermark capture app 232. In one embodiment, installation of digital watermark capture app 232 may include providing demographic information about the user, such as name, age, gender, occupation, income, place of residence, employer, family information, as non-limiting examples. The demographic information may be accessible to digital watermark capture app 232. Then, when a digital watermark appears in multimedia content being viewed by the user, the user may activate digital watermark capture app 232 and capture the digital watermark using digital camera 212 (see also FIG. 1). To capture the digital watermark, the user may simply hold mobile device 200 such that digital camera 212 acquires an image including the multimedia content, such as a television commercial, using digital watermark capture app 232. Digital watermark capture app 232 may then, for example, send the demographic information and a digital watermark value obtained from the digital watermark to watermark service provider 160 (see FIG. 1) using wireless transceiver 204. Specifically, mobile device 200 may communicate with a watermark server (see FIG. 4) operated by watermark service provider 160. After receiving and validating the digital watermark value, watermark service provider 160 may return an advertising token to digital watermark capture app 232, where it may be accessed and used by the user. The advertising token may include links to on-line content and/or code executable by processor 202 on mobile device 200. It is further noted that digital watermark capture app 232 may track actions by the user, such as usage of advertising tokens on mobile device 200, and report usage data for the user back to watermark service provider 160.

Figure 3:
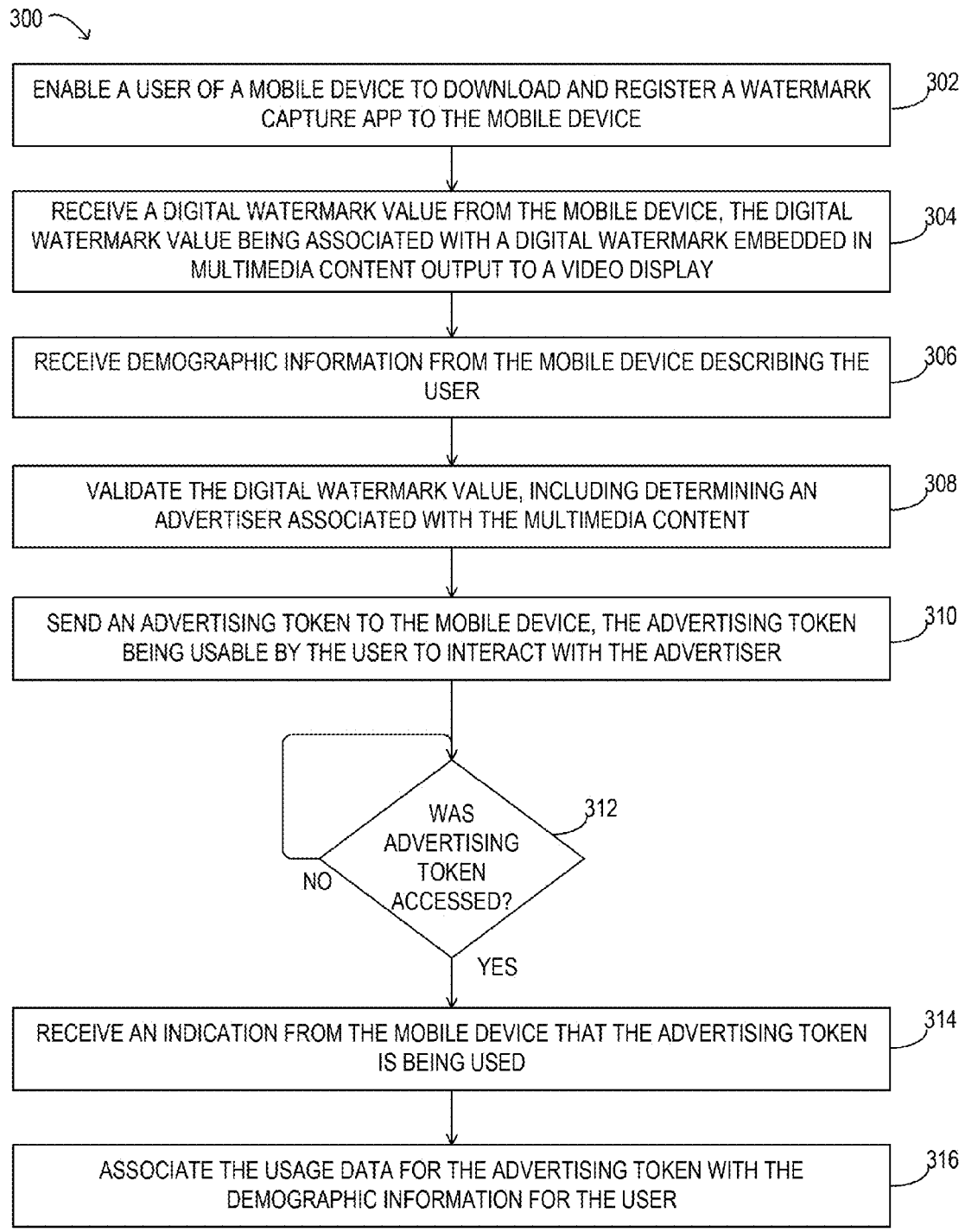
FIG. 3 is a flowchart depicting selected elements of an embodiment of a method for interactive advertising using a digital watermark.

Turning now to FIG. 3, a block diagram of selected elements of an embodiment of method 300 for interactive advertising using digital watermarks is depicted in flow-chart form. Method 300 may be performed by watermark service provider 160 (see FIG. 1), for example, using watermark server (see FIG. 4). It is noted that certain operations described in method 300 may be optional or may be rearranged in different embodiments.

Method 300 may begin by enabling (operation 302) a user of a mobile device to download and register a watermark capture app to the mobile device. The user may be prompted to enter their own demographic information upon installing the watermark capture app on the mobile device. A digital watermark value may be received (operation 304) from the mobile device, the digital watermark value being associated with a digital watermark embedded in multimedia content output to a video display. The digital watermark value may be captured by the watermark capture app when the user acquires an image of the digital watermark using a camera included in the mobile device. Demographic information describing the user may be received (operation 306) from the mobile device. In certain embodiments, receiving the demographic information may include storing the demographic information as demographic data 452 in watermark database 450 (see FIG. 4). The digital watermark value may be validated (operation 308), including determining (operation 308) an advertiser associated with the multimedia content. Validating the digital watermark in operation 308 may further include determining a date and time associated with the multimedia content, determining a location of the mobile device, determining a media market associated with the video display, determining a television program during which the multimedia content is broadcast, determining a television channel on which the multimedia content is broadcast, determining at least one advertising token associated with the digital watermark value, validating that the advertiser ordered the digital watermark to be included in the multimedia content, validating that a mobile app executing on the mobile device is registered to the user, or any combination thereof, among others. Next, an advertising token may be sent (operation 310) to the mobile device, the advertising token being usable by the user to interact with the advertiser. Then in method 300, a decision may be made whether the advertising token was accessed (operation 312). When the result of operation 312 is NO, method 300 may loop back to operation 312. In other words, method 300 may wait until the advertising token was accessed. When the result of operation 312 is YES, the advertising token was accessed and method 300 may proceed to operation 314, in which an indication is received (operation 314) from the mobile device that the advertising token is being used. The indication received in operation 314 may further describe how and when the advertising token is being used and may accordingly include usage data. The usage data may include a date and time associated with usage of the advertising token, a type of usage of the advertising token, an amount of usage associated with the advertising token, a location associated with usage of the advertising token, a universal resource locator (URL) associated with usage of the advertising token, a purchase amount associated with usage of the advertising token, information provided by the user in response to the advertising token, or any combination thereof, among other types of usage data. In certain embodiments, operation 314 may include storing the usage data as watermark usage data 454 in watermark database 450 (see FIG. 4). The usage data for the advertising token may be associated (operation 316) with the demographic information for the user.

Figure 4:
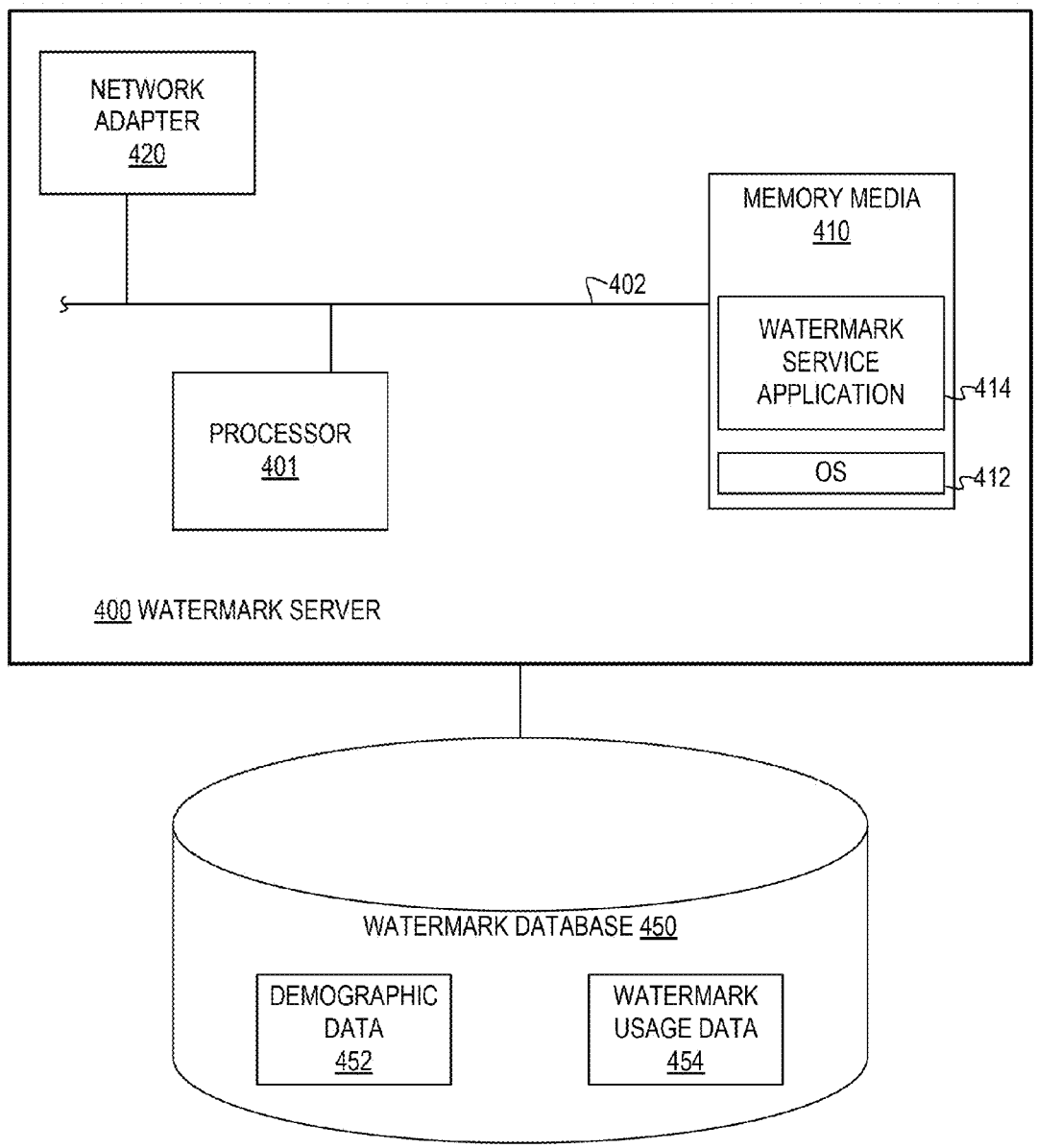
FIG. 4 is a block diagram of selected elements of an embodiment of a watermark server.

Referring now to FIG. 4, a block diagram showing selected elements of an embodiment of watermark server 400 is illustrated. As depicted in FIG. 4, watermark server 400 includes processor 401 and memory media 410, which may communicate using system bus 402. Also shown accessible via system bus 402 is network adapter 420 that may provide connectivity to a network.

As shown in FIG. 4, memory media 410 may represent volatile, non-volatile, fixed, and/or removable media, and may be implemented using magnetic and/or semiconductor memory. Memory media 410 is capable of storing instructions and/or data. As shown, memory media 610 stores instructions (i.e., code executable by processor 401) including operating system (OS) 412 and watermark service application 414. Operating system 412 may be any of a variety of operating systems, such as a UNIX variant, LINUX, a Microsoft Windows® operating system, or a different operating system. Watermark service application 414 may embody various applications and functionality, for example, as described in method 300 (see FIG. 3). Also shown in FIG. 3 is watermark database 450, which may be linked to watermark server 400 for providing structured data storage. Watermark database 450 may store demographic data 452 and watermark usage data 454 for a plurality of users. It is noted that, in certain embodiments, watermark database 450 may be included with watermark server 400.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for interactive advertising, comprising:
   receiving, at a server, a digital watermark value from a mobile device, wherein the digital watermark value is associated with a digital watermark imperceptible to the human eye embedded in video content output to a video display, wherein the video content includes an advertisement purchased by an advertiser, and wherein the digital watermark is embedded in the advertisement;
   receiving demographic information from the mobile device, wherein the demographic information describes a user of the mobile device;
   validating the digital watermark value, including determining the advertiser associated with the video content; and
   responsive to validating the digital watermark value, sending an advertising token to the mobile device, wherein the advertising token is usable by the user to interact with the advertiser,
   wherein validating the digital watermark value includes:
      determining the advertising token associated with the digital watermark value;
      validating that the advertiser ordered the digital watermark to be included in the video content; and
      validating that a mobile app executing on the mobile device is registered to the user.

2. The method of claim 1, further comprising:
   when the user accesses the advertising token, receiving usage data from the mobile device, the usage data indicating usage of the advertising token by the user; and
   associating the usage data for the advertising token with the demographic information, wherein the usage data includes at least one of:
      a date and time associated with usage of the advertising token;
      a type of usage of the advertising token;

an amount of usage associated with the advertising token;
a location associated with usage of the advertising token;
a universal resource locator (URL) associated with usage of the advertising token;
a purchase amount associated with usage of the advertising token; and
information provided by the user in response to the advertising token.

3. The method of claim 2, further comprising:
based on at least one of the demographic information and the usage data, determining a price for future advertisements that include a digital watermark.

4. The method of claim 2, further comprising:
based on the receiving the digital watermark value, determining that the user has replayed the video content after the video content has been broadcast.

5. The method of claim 1, wherein the advertising token includes an electronic coupon for the user, the electronic coupon being usable for a transaction associated with the advertiser.

6. The method of claim 1, wherein the advertising token includes a link to a website associated with the advertiser.

7. The method of claim 1, wherein validating the digital watermark value includes at least one of:
determining a date and time associated with the video content;
determining a location of the mobile device;
determining a media market associated with the video display;
determining a television program during which the video content is broadcast; and
determining a television channel on which the video content is broadcast.

8. A server for interactive advertising, comprising:
a processor having access to memory media, the memory media storing processor-executable instructions that, when executed by the processor, cause the processor to:
receive a digital watermark value from a mobile device, wherein the digital watermark value is associated with a digital watermark imperceptible to the human eye embedded in video content output to a video display, wherein the video content includes an advertisement purchased by an advertiser, and wherein the digital watermark is embedded in the advertisement;
receive demographic information from the mobile device, wherein the demographic information describes a user of the mobile device;
validate the digital watermark value, including instructions to determine the advertiser associated with the video content; and
responsive to the instructions to validate the digital watermark value, send an advertising token to the mobile device, wherein the advertising token is usable by the user to interact with the advertiser,
wherein the instructions to validate the digital watermark value include instructions to:
determine the advertising token associated with the digital watermark value;
validate that the advertiser ordered the digital watermark to be included in the video content; and
validate that a mobile app executing on the mobile device is registered to the user.

9. The server of claim 8, wherein the memory media store instructions to:
when the user accesses the advertising token, receive usage data from the mobile device, the usage data indicating usage of the advertising token by the user; and
associate the usage data for the advertising token with the demographic information, wherein the usage data includes at least one of:
a date and time associated with usage of the advertising token;
a type of usage of the advertising token;
an amount of usage associated with the advertising token;
a location associated with usage of the advertising token;
a universal resource locator (URL) associated with usage of the advertising token;
a purchase amount associated with usage of the advertising token; and
information provided by the user in response to the advertising token.

10. The server of claim 9, wherein the memory media store instructions to:
based on at least one of the demographic information and the usage data, determine a price for future advertisements that include a digital watermark.

11. The server of claim 9, wherein the memory media store instructions to:
based on the receiving the digital watermark value, determine that the user has replayed the video content after the video content has been broadcast.

12. The server of claim 8, wherein the advertising token includes an electronic coupon for the user, the electronic coupon being usable for a transaction associated with the advertiser.

13. The server of claim 8, wherein the advertising token includes a link to a website associated with the advertiser.

14. The server of claim 8, wherein the instructions to validate the digital watermark value include instructions to perform at least one of:
determine a date and time associated with the video content;
determine a location of the mobile device;
determine a media market associated with the video display;
determine a television program during which the video content is broadcast; and
determine a television channel on which the video content is broadcast.

15. An article of manufacture comprising non-transitory computer readable memory media storing processor-executable instructions, the instructions, when executed by a processor, cause the processor to:
receive a digital watermark value from a mobile device, wherein the digital watermark value is associated with a digital watermark imperceptible to the human eye embedded in video content output to a video display, wherein the video content includes an advertisement purchased by an advertiser, and wherein the digital watermark is embedded in the advertisement;
receive demographic information from the mobile device, wherein the demographic information describes a user of the mobile device;
validate the digital watermark value, including instructions to determine the advertiser associated with the video content; and
responsive to the instructions to validate the digital watermark value, send an advertising token to the mobile device, wherein the advertising token is usable by the user to interact with the advertiser, wherein the instructions to validate the digital watermark value include instructions to:
- determine the advertising token associated with the digital watermark value;
- validate that the advertiser ordered the digital watermark to be included in the video content; and
- validate that a mobile app executing on the mobile device is registered to the user.

16. The article of manufacture of claim 15, wherein the memory media store instructions to:
- when the user accesses the advertising token, receive usage data from the mobile device, the usage data indicating usage of the advertising token by the user; and
- associate the usage data for the advertising token with the demographic information, wherein the usage data includes at least one of:
  - a date and time associated with usage of the advertising token;
  - a type of usage of the advertising token;
  - an amount of usage associated with the advertising token;
  - a location associated with usage of the advertising token;
  - a universal resource locator (URL) associated with usage of the advertising token;
  - a purchase amount associated with usage of the advertising token; and
  - information provided by the user in response to the advertising token.

17. The article of manufacture of claim 16, wherein the memory media store instructions to: based on at least one of the demographic information and the usage data, determine a price for future advertisements that include a digital watermark.

18. The article of manufacture of claim 16, wherein the memory media store instructions to: based on the receiving the digital watermark value, determine that the user has replayed the video content after the video content has been broadcast.

19. The article of manufacture of claim 15, wherein the advertising token includes at least one of:
- an electronic coupon for the user, the electronic coupon being usable for a transaction associated with the advertiser;
- a link to a website associated with the advertiser;
- a link to social media associated with the advertiser; and
- a promotion associated with the advertiser.

20. The article of manufacture of claim 15, wherein the instructions to validate the digital watermark value include instructions to perform at least one of:
- determine a date and time associated with the video content;
- determine a location of the mobile device;
- determine a media market associated with the video display;
- determine a television program during which the video content is broadcast; and
- determine a television channel on which the video content is broadcast.

* * * * *